Figure 1:
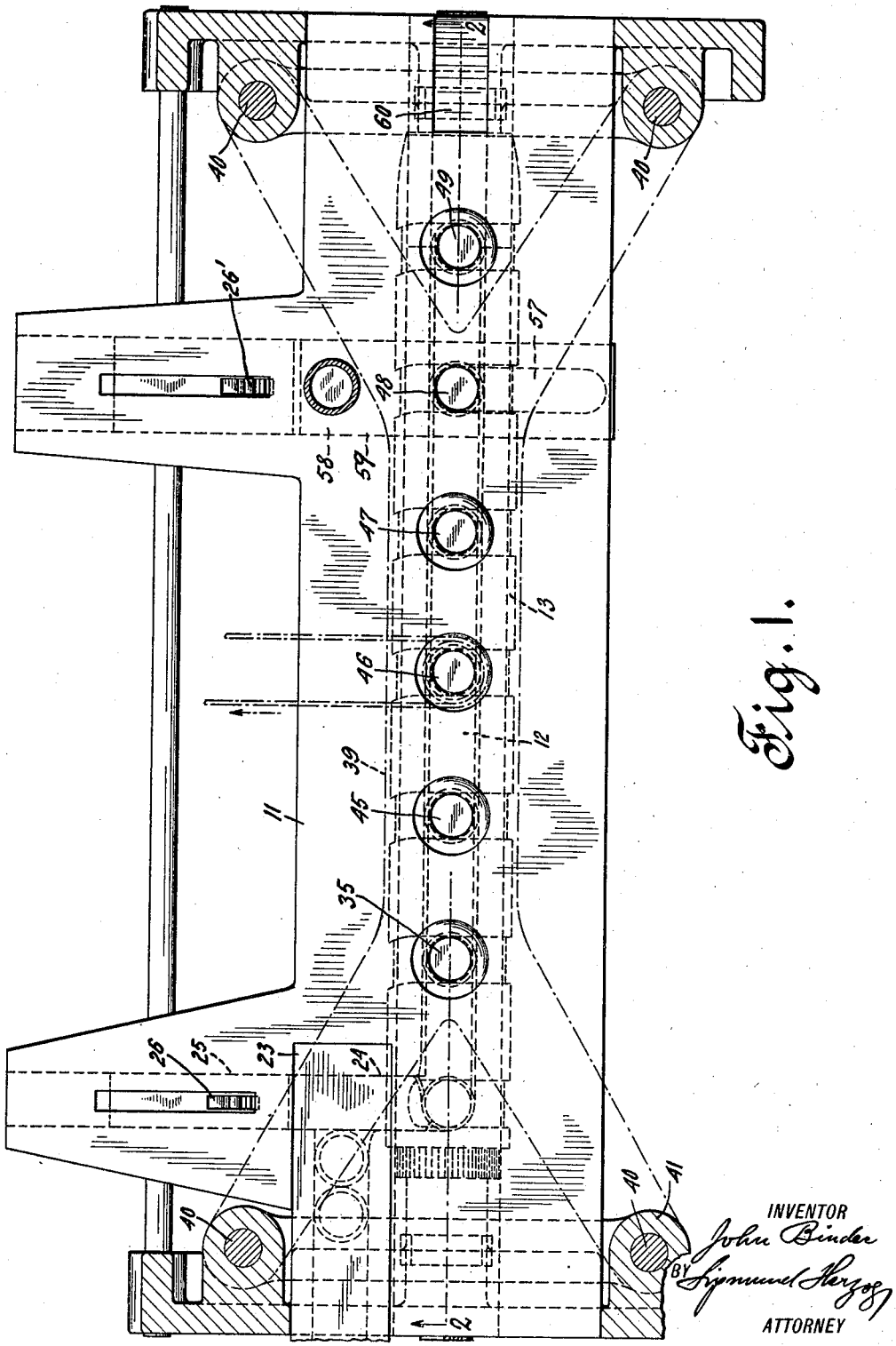

J. BINDER.
MACHINE FOR THE MANUFACTURE OF BOTTLE CLOSURES.
APPLICATION FILED SEPT. 26, 1919.

1,387,037.

Patented Aug. 9, 1921.
4 SHEETS—SHEET 3.

INVENTOR
John Binder
BY
Sigmund Herzog
ATTORNEY

J. BINDER.
MACHINE FOR THE MANUFACTURE OF BOTTLE CLOSURES.
APPLICATION FILED SEPT. 26, 1919.

1,387,037.

Patented Aug. 9, 1921.

4 SHEETS—SHEET 4.

UNITED STATES PATENT OFFICE.

JOHN BINDER, OF NEW YORK, N. Y., ASSIGNOR TO INTERNATIONAL CORK COMPANY, OF BROOKLYN, NEW YORK, A CORPORATION OF NEW YORK.

MACHINE FOR THE MANUFACTURE OF BOTTLE-CLOSURES.

1,387,037.  Specification of Letters Patent.  Patented Aug. 9, 1921.

Application filed September 26, 1919. Serial No. 326,514.

*To all whom it may concern:*

Be it known that I, JOHN BINDER, a citizen of Hungary, and a resident of New York, in the county of Kings and State of New York, have invented certain new and useful Improvements in Machines for the Manufacture of Bottle-Closures, of which the following is a specification.

The present invention relates to a machine for the manufacture of closures or stoppers for bottles or like receptacles, more particularly it relates to a machine for making closures of the cap variety, including those termed "crown corks". Closures of this type consist of a metallic cap or crown, to be locked to the exterior of the neck of the bottle, and of a sealing disk or packing of cork or the like, which is united by the aid of a suitable cementing medium with the cap or crown. There may be either used a fusible cementing medium, which is fused when in the cap or crown and left to cool and set, or the cap or crown is charged with a liquid or viscous cementing material, which is caused to set or to coagulate, as the case may be.

The machines, as heretofore used, for assembling the several parts of the closures, comprise each a rotary carrier or transporting mechanism, which presents the metallic parts of the closures, or in other words the caps, to the several charging and assembling mechanisms. This rotary carrier or transporting means moves intermittently, that is to say step by step. Since these machines operate at great speed, making about 230 closures per minute, parts of the cap carrier or transporting mechanism wear out quickly, due mainly to the intermittent movement thereof. The slightest lost motion of the cap carrier or transporting mechanism causes serious trouble in that it does not present the caps to the several charging and assembling mechanisms at the proper places, the result being that many caps are crushed, which interfere with the proper operation of the machine, not speaking of the loss in material.

The main object of the present invention is to provide a cap transporting mechanism that rotates continuously, thereby overcoming the defects above referred to.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 2:
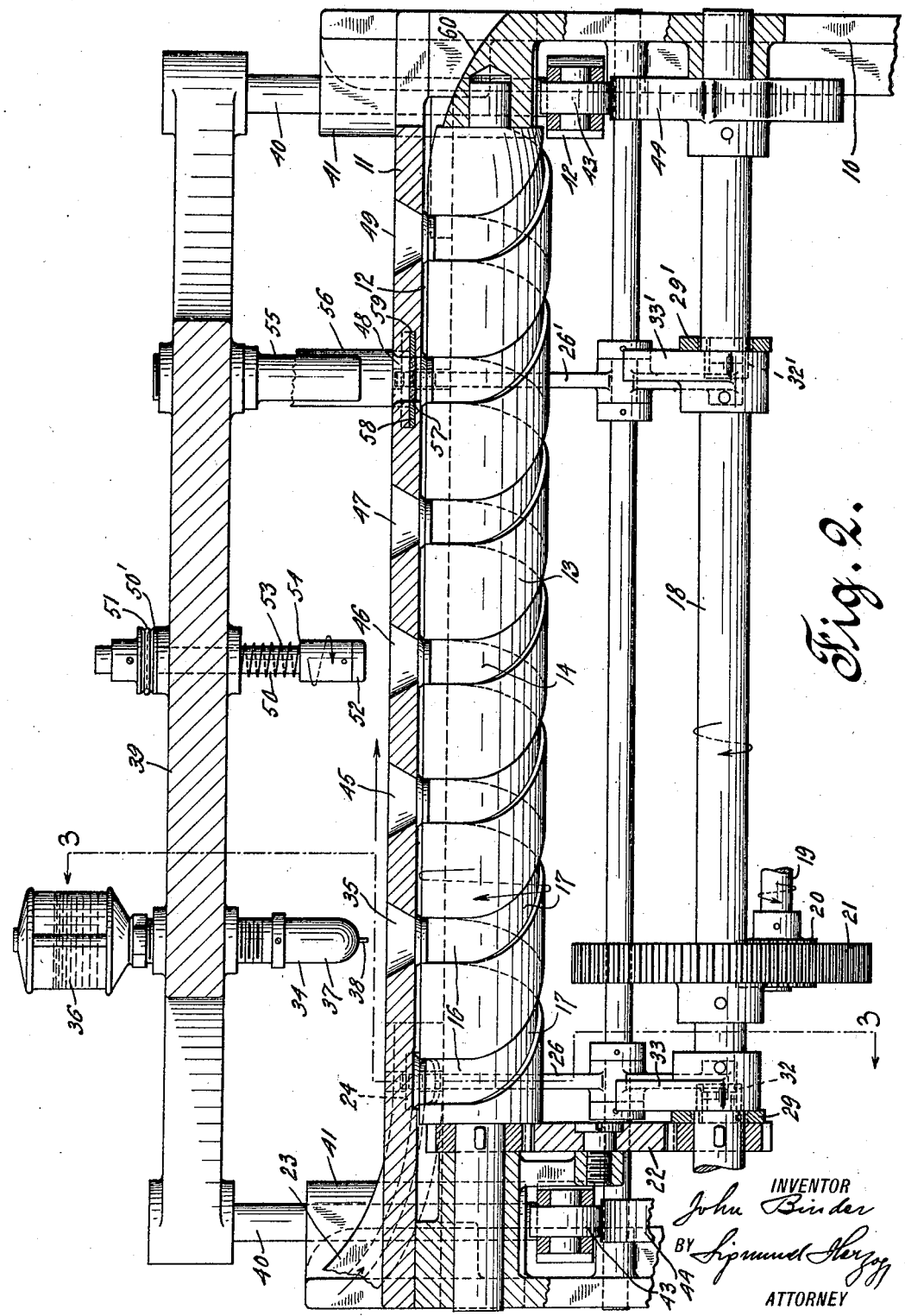
Figure 3:
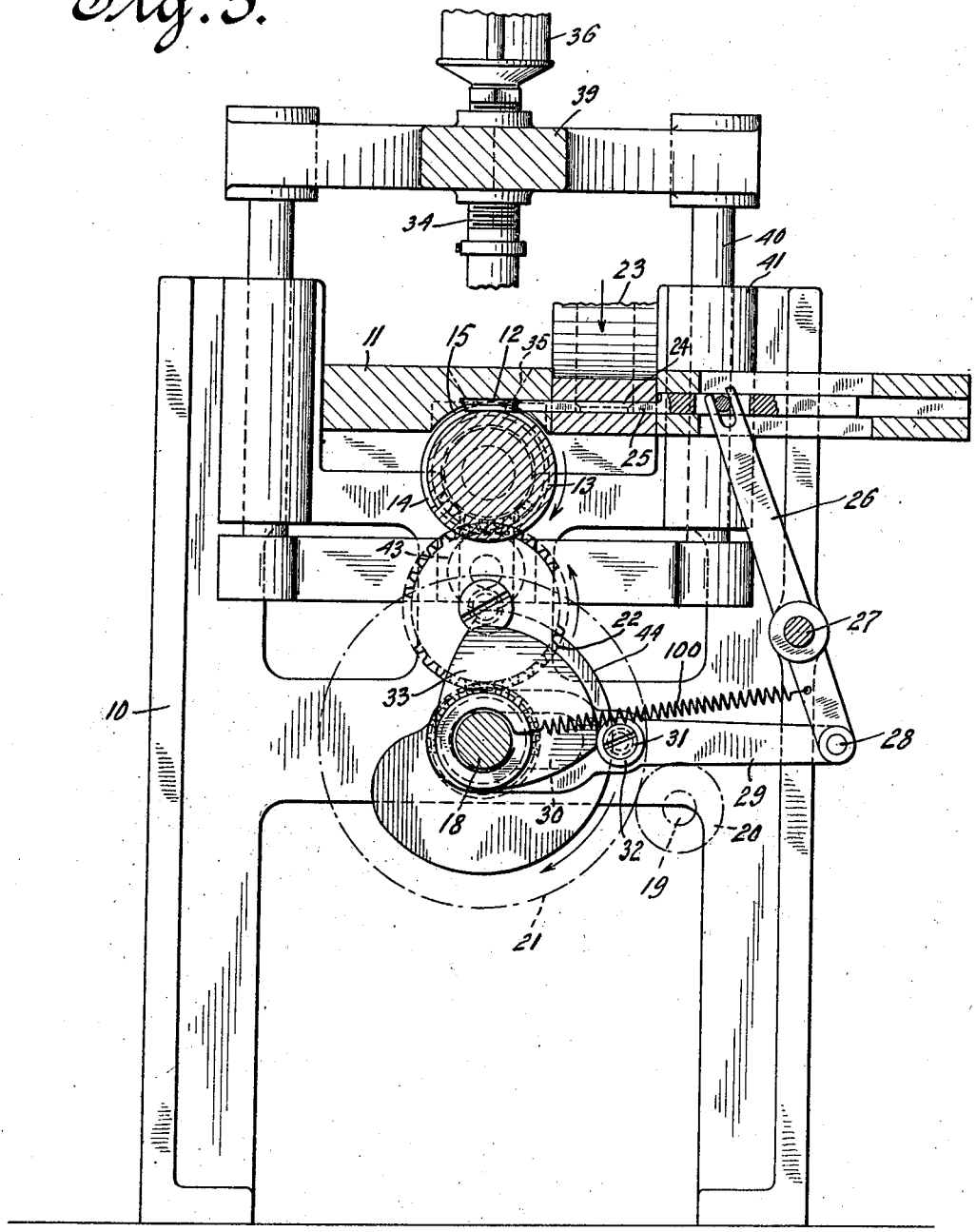
Figure 4:
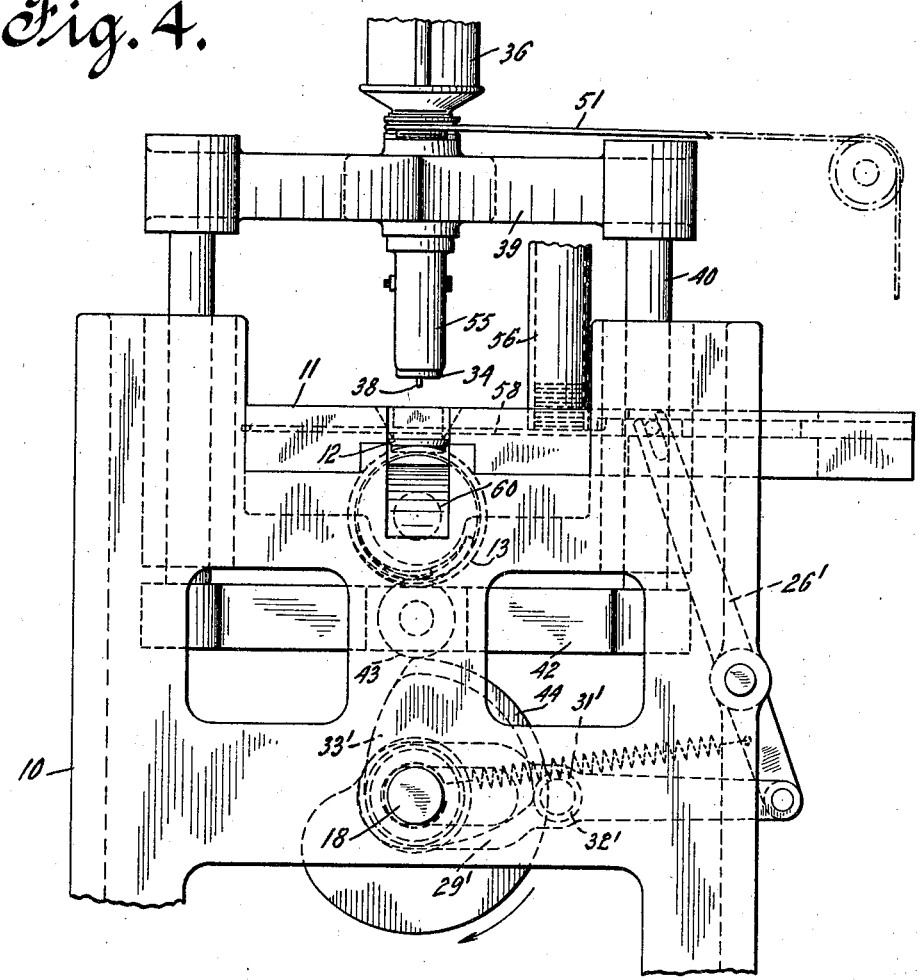
Figure 5:
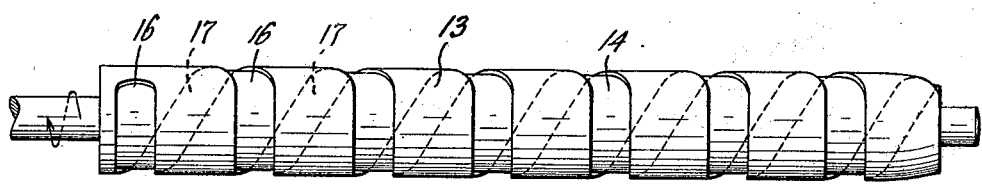

Figure 1 is a top plan view, partly in section, of a machine constructed in accordance with the present invention, some elements being removed in order to more clearly show the construction; Fig. 2 is a section taken on line 2—2 of Fig. 1; Fig. 3 is a section taken on line 3—3 of Fig. 2; Fig. 4 is a side elevation of the machine; and Fig. 5 is an elevation of the cap transporting mechanism.

In the drawings, the numeral 10 indicates the frame of the machine, including a horizontal table portion 11. In the underface of this table portion is provided a longitudinally extending groove 12, the width of which is somewhat larger than the diameter of the corrugated flange portion of the metallic cap of a closure, or in other words the said groove accommodates the flanges of the caps used in manufacturing the bottle closures. In alinement with the groove there is rotatably mounted in the frame, below the table portion 11, a cylinder 13, having a helical groove 14 of a size accommodating the head portions of the metallic caps. The underface of the table portion 11 of the machine frame is recessed at 15 on both sides of the groove 12, and in this recess is seated the cylinder 13, to bring the groove in the latter as close as possible to the groove in the table portion 11. Each turn of the groove in the cylinder comprises a straight section 16, that runs in a plane at right angles to the longitudinal axis of the cylinder, and a curved section 17, connecting the straight section with the straight section of the next turn, as clearly appears from Fig. 5 of the drawings. The cylinder may be rotated in any suitable manner from a driving shaft 18, that is suitably journaled in the frame and receives motion from any suitable source of power, for instance an electric motor, the shaft of which is denoted by the numeral 19. To this motor shaft is fixed a pinion 20, in mesh with a gear 21 on the driving shaft. The connection between the driving shaft and the cylinder is made by a train of gears 22, the train being so designed that one turn of the driving shaft results in one turn of the cylinder.

The cylinder 13 constitutes the cap transporting mechanism of the machine, conveying the caps step by step to the several elements of the machine, which insert into the caps the cementing material and the sealing disk of cork or the like. The caps may be passed to the transporting mechanism, that is to say into the helical groove of the cylinder 13, either manually or automatically. In the drawings an automatic device is disclosed, coacting with a charging chute 23, into which the caps are brought in their inverted positions in any suitable manner. The chute leads to a channel 24 in the table portion 11, said channel extending at right angles to the groove 12 and terminating in the latter. In the channel is disposed a slide 25, that is in engagement with a lever 26, the latter being fulcrumed at 27 to the frame and pivoted at 28 to a bar 29. This bar extends horizontally and is provided with a longitudinal slot 30, through which the driving shaft 18 extends. The bar carries a lug 31, on which is mounted an anti-friction roller 32, in engagement with a cam 33, the latter being fixed to the driving shaft. A spring 100 keeps the roller 32 continuously in contact with the cam 33. The relation between said cam and the first turn of the helical groove 14 is such that, when the straight section of the said first turn is in alinement with the channel 24, the slide 25 is caused to move toward the cylinder 13, thus seating the cap in the groove 12 and the first turn of the helical groove 14.

The caps received from the chute are moved along the groove 12 in the direction of the arrow shown in Fig. 2 of the drawings, and are brought, one after the other, into registering position with the means which introduces into the same the cementing medium. The cementing medium applying means, denoted in the drawings by the numeral 34, is disposed above the table portion 11, and in alinement therewith is provided in the said table portion an aperture 35 that extends to the groove 12 therein. This aperture is located at a distance from the channel 24, which corresponds to the pitch of the helical groove 14. As the cylinder 13 rotates, the caps in the groove therein are caused to move in the direction of the arrow shown in Fig. 2 of the drawings while they are seated in the curved sections 17 of the groove, remaining stationary, in the rotation of the said cylinder, while located in the straight sections 16 thereof. The cementing medium is applied to the cap while it remains stationary in registering position with the aperture 35 above mentioned. The mechanism for applying the cementing medium may be of any suitable construction, for instance of the type described in U. S. Letters Patent No. 1,249,714, granted on December 11, 1917, to International Cork Company, as assignee of Alexander Bogdanffy, for a machine for the manufacture of bottle closures. The said mechanism includes a receptacle 36, communicating with a valve casing 37, through which the liquid cementing medium is adapted to flow toward a valve. To this valve, not shown in the drawings, is attached a pin 38, that projects, through the discharge opening in the valve casing, toward the table portion 11. The entire mechanism is carried by a head 39, that is mounted upon vertically extending frame members 40, in the form of bars, that extend slidably through guides 41 on the machine frame and are connected below the table portion 11 by transverse frame sections 42. There are two of these frame sections provided, one adjacent each end of the frame 10, each transverse frame section carrying a roller 43, with which is adapted to coöperate a cam 44, that is fixed to the driving shaft 18. The relation between these cams and the helical groove above referred to is such that the head 39 is caused to move on its downward stroke while the caps remain stationary, it moving upward while the caps are being transported. Upon the downward movement of the head 39, that is to say when a cap is held in registering position with the cementing medium charging means, the pin 38 is caused to bear against the inner face of the cap, whereby the valve is lifted from its seat and the desired amount of liquid cementing medium is introduced into the cap. Upon the upward stroke of the head 39, the valve is closed by a spring co-acting therewith (not shown).

Through the table portion 11 extend, besides the aperture 35, a plurality of apertures, denoted in their order by the numerals 45, 46, 47, 48 and 49, all of said apertures being in alinement with and leading to the groove 12, and being spaced equidistantly, the distance between two adjacent apertures corresponding to the pitch of the helical groove 14.

The cap, into which the cementing medium has been introduced is first transported to the aperture 45, remaining there stationary for a substantial time. While stationary, it may be viewed by the operator to ascertain as to whether or not cementing medium has been placed into the same. It is then transported into registering position with the aperture 46, with the latter being in alinement a mechanism which spreads the cementing material over the entire inner face of the head of the cap. This mechanism comprises, in the case illustrated in the drawings, a vertically disposed spindle 50, which is rotatably and reciprocably mounted on the head 39. Upon the spindle is mounted, above the head 39, a pulley 50', bearing against the said head, so that the spindle will be caused to move with the said head. Over this pulley runs a belt 51, driven from the driving shaft 18, the driving means being not shown as the same does not form part of the present invention. To the lower end of the spindle is attached a block 52, for instance of rubber. A spring 53 bears against an enlargement 54 on the spindle and against the underface of the head, for a purpose presently to be described. The reciprocating head 39 carries with it the spindle 50, which rotates continuously. When the head 39 is near the end of its down stroke, the block 52 is brought into contact with the inner face of the cap. When in contact, the rotary block spreads the liquid cementing material over the entire inner face of the head of the cap, which may be held against rotation by any suitable means (not shown). The head, upon its further downward movement, compresses the spring 48. When the head moves upward, it leaves the block 52 in contact with the inner surface of the cap until the upper face of the head contacts with the pulley 50' and thereby carries the spindle with it. The purpose of carrying the spindle slidably upon the head 39 is to permit the said spindle to remain for some time within the cap, thus enabling it to perform properly the spreading operation. If no sliding motion were permitted between the head and spindle, the latter would stay for a moment only in the cap, inasmuch as the head starts its upward stroke immediately after it has finished its downward stroke. It is to be observed that it is not essential that the block 52 be rotated; it will spread the cementing medium by simply being pressed against the inner face of the cap.

After the cementing material has been spread over the surfaces of the caps, the same are transported, one after the other, to the aperture 47, where they remain stationary and may be examined by the operator. They are then carried to the aperture 48, in alinement with which is attached to the head 39 an assembling plunger 55. The sealing disks are placed into a vertical tube 56, which is held above the table portion 11 a distance that is somewhat greater than the thickness of an individual sealing disk. The sealing disks are fed by gravity, or otherwise, into a slot 57 of a plate member 58, that is disposed below the vertical tube 56, but above the groove 12 in the table portion 11. The plate member 53 is slidably arranged in a guideway 59 in the table portion 11, in which the sealing disks are conveyed from below the tube 56 to the aperture 48. The plate member is connected with a lever 26' (Fig. 4), a bar 29', carrying a lug 31' and an anti-friction roller 32', the latter co-acting with a cam 33' on the driving shaft 18. These elements are of the same construction as the corresponding elements of the slide 25, so that a further detailed description thereof seems to be unnecessary. Obviously, the cam 33' must be so timed that when the head 39 is on its upward stroke, the plate member 58 will convey a sealing disk within the reach of the plunger 55, which, in its downward movement, forces the sealing disk through the aperture 48 into a metallic cap on top of the cementing material therein.

The assembled crowns are then moved, one after the other, to the aperture 49, remaining there stationary for some time, and then to a chute 60, where they slide down to a heating and uniting head, not shown.

Attention is called to the fact that, while herein specific means have been shown for assembling the elements of the closure, others may be used just as well without departing from the invention, which lies mainly in the cap transporting mechanism.

What I claim is:—

In a machine for the manufacture of bottle closures of the cap variety, the combination with a machine frame having a horizontal table portion provided with a straight groove in its underface, of a continuously rotating carrier comprising a cylinder having a helical groove accommodating a portion of each cap, another portion of each cap being seated in said straight groove, each turn of said helical groove consisting of a section running in a plane at right angles to the longitudinal axis of said cylinder and a curved section connecting said first-mentioned section with the similar section in the next turn in the series, said table portion being provided with a line of apertures extending therethrough to the groove therein, said apertures being spaced apart corresponding to the pitch of said helical groove, whereby the caps advanced by said carrier along said straight groove are simultaneously stopped when in alinement with said apertures.

Signed at New York, in the county of Kings, and State of New York, this 30th day of August, A. D. 1919.

JOHN BINDER.